United States Patent [19]
Delabastita et al.

[11] Patent Number: 6,118,513
[45] Date of Patent: Sep. 12, 2000

[54] METHOD AND APPARATUS FOR COPYING TRANSPARENCIES TO LIGHT-SENSITIVE MATERIAL

[75] Inventors: Paul A. Delabastita, Edegem, Belgium; Günter Findeis, Sauerlach, Germany; Manfred Fürsich, Taufkirchen, Germany; Josef Moseler, Biessenhofen, Germany

[73] Assignee: AGFA-Gevaert AG, Leverkusen, Germany

[21] Appl. No.: 09/163,239

[22] Filed: Sep. 30, 1998

[30] Foreign Application Priority Data

Oct. 15, 1997 [DE] Germany .............................. 197 45 498

[51] Int. Cl.[7] .......................... G03B 27/00; G03B 27/72; G03B 27/52
[52] U.S. Cl. .................................. 355/18; 355/35; 355/40
[58] Field of Search ...................................... 358/298, 456, 358/429; 355/35, 38, 40, 41, 71, 18

[56] References Cited

U.S. PATENT DOCUMENTS

| | | |
|---|---|---|
| 4,239,385 | 12/1980 | Hujer ........................................ 355/71 |
| 4,350,996 | 9/1982 | Rosenfeld .................................. 358/75 |
| 5,543,935 | 8/1996 | Harrington .............................. 358/298 |
| 5,602,943 | 2/1997 | Velho et al. ............................. 358/298 |
| 5,638,153 | 6/1997 | Zahn et al. ................................ 355/35 |
| 5,798,821 | 8/1998 | Zahn et al. ................................ 355/46 |
| 5,978,066 | 11/1999 | Treiber et al. ............................ 355/40 |

FOREIGN PATENT DOCUMENTS

| | | |
|---|---|---|
| 0 571 010 | 11/1993 | European Pat. Off. . |
| 40 40 498 | 6/1992 | Germany . |
| 196 38 635 | 4/1997 | Germany . |

*Primary Examiner*—Alan A. Mathews
*Assistant Examiner*—Hung Henry Nguyen
*Attorney, Agent, or Firm*—Darby & Darby

[57] ABSTRACT

The invention relates to a method and an apparatus for copying transparencies to a light-sensitive material, the apparatus including an illuminator for illuminating the original, wherein the illuminator has a plurality of individually addressable pixels which can be switched to light or dark and which are controlled according to a raster image. The density values of the original are first determined with a predetermined spatial and gray-scale resolution and the raster image is subsequently generated from the density values of the original according to the error diffusion method.

10 Claims, 3 Drawing Sheets

METHOD AND APPARATUS FOR COPYING TRANSPARENCIES TO LIGHT-SENSITIVE MATERIAL

BACKGROUND OF THE INVENTION

1. Field of the Invention

The present invention relates to a method and an apparatus for copying transparent originals, or transparencies, to light-sensitive material, using an illuminator with controllable pixels which can be switched to light or dark for illuminating the image. The apparatus of the invention also includes an objective for imaging transparencies onto light-sensitive material.

Copies of photographic pictures which exhibit large differences in optical density in different areas, are frequently overexposed in the light areas or underexposed in the dark areas. Consequently, details or finer features that are reproduced on paper copies are either very poorly or hardly recognizable at all.

2. Description of the Related Art

A copying apparatus is described in German Patent DE PS 28 20 965 wherein the illuminator for the photographic film is a light source and a liquid crystal display (LCD). The display is electrically addressed so as to generate a black and white negative mask of the original. When the paper is exposed through both the mask and the original image, the optical density is compressed as required. To generate a corresponding black and white mask, the LCD must generate gray scale values. If an LCD with a ferro-electric liquid crystal is used, then the gray scale values to be produced have to be rastered, since the individual pixels of an LCD of this type can only be switched to either light or dark.

U.S. Pat. No. 5,638,153 describes to subdivide the LCD into fixed areas. These areas which can be called macro pixels, are subdivided into six individually addressable pixels having areas with a ratio of 1:2:4:8:16:32. By combining and addressing the pixels in different ways, macro pixels with 64 brightness levels can be generated.

It has been observed that a mask generated in this way can be used to copy finely detailed photographic images with excellent results, without causing Moire patterns, i.e. beat frequencies, which are typical in the reproduction of fine features. However, when images with large and very uniform areas are copied, the copy frequently exhibits features which are absent in the transparent original image.

It has also been observed that the masking process blurs sharp edges in the transparent original to such a degree that the paper copy exhibits non-uniform fringes at those edges.

SUMMARY OF THE INVENTION

Accordingly, it is an object of the invention to overcome the problem of overexposing or underexposing copies of photographic pictures which exhibit large differences in optical density in certain areas.

It is another object of the present invention to address an LCD to generate a mask with a pre-determined resolution, such that large uniform areas in a transparency are reproduced as uniform areas in the copy and/or that sharp lateral edges of these uniform areas are reproduced without fringes.

It is yet another object of the present invention to provide a method for copying in which the density values of the photographic original are measured with a predetermined spatial and gray-scale resolution, and to provide a raster image that is generated from the density values which is reversed with respect to the original, and to address the individual pixels of the illuminator according to the raster image which is generated with an error diffusion method.

Further, it is an object of the present invention to provide an apparatus having an image storage device for storing density values of the original with a predetermined spatial and grayscale resolution and a computing device. The computing device is constructed such as to generate a mask from the density values of the image storage device. A raster image of the mask is generated with a raster hardware, according to the error-diffusion method. The control device is connected to the computing device and the illuminator such that the switchable pixels can be addressed according to the generated raster image.

According to the invention, a transparency image is masked with an LCD which is addressed according to a raster image in such a way that the gray values to be represented are produced without a regular pattern. Regular patterns, e.g. the uniform macro pixels of the above referenced U.S. Pat. No. 5,638,153 which are used to generate the gray values, can blur the edges in the copy when they are superimposed on other patterns which are also regular, e.g. edges in the original to be copied. To generate a raster without a regular pattern, a computer determines an output image with a predetermined spatial and gray level resolution from the density values of the scanned original. Using error diffusion, the output image is rastered along a path which includes all resolved pixels. The density value of the first pixel on this path is then compared to a threshold value and is set to light or dark depending on the outcome of the comparison. The resulting error is added to the second pixel along the path. This new value is then again compared to the threshold value and set to light or dark according to the comparison. The corresponding error is again added to the next pixel, so that by using this raster method a respective error is passed on from one pixel to the next, so that in this calculation an error diffusion propagates across the entire raster image. The so-called raster threshold value to which each density value of the image is compared, can be varied. Excellent results have been obtained with raster threshold values which were specifically selected for each image and set to the maximum density of the image. After all raster pixels are computed, the raster image has the same spatial resolution as the output image.

The simplest path through an output image is a path where the individual pixels of the output image are processed row by row. Error diffusion already reduces the regular patterns significantly. However, fixed patterns have been found which provide an even higher resolution of these regular patterns. It is feasible to select a random path which, however, requires a significant amount of computation since the path has to be selected so that the next pixel on the path is located always immediately adjacent to the preceding calculated pixel and all pixels of the output image are indeed processed. It would also be feasible to select a sufficiently chaotic path which remains unchanged for each image and which consequently requires very little computation. One example for a predetermined path of this type is the so-called Peano curve (see, for example, "Chaos, building blocks for ordered structures", Peitgen/Jürgens/Saupe, 1994, Springer Verlag) which is a variation of a self-avoiding path and completely fills an area. A particularly effective variation of this type of path is, e.g., the Hilbert path which can be calculated with a simple algorithm since certain steps in determining the path are repetitive.

Rastering of the original image can be accelerated by storing the predetermined path in a look-up table (LUT). The individual pixels are here associated only with a place in a sequence, so that it is no longer necessary to compute the next pixel in the rastering process. The advantages of a LUT apply to all predetermined paths.

It is very time-consuming to scan the original in high resolution to generate the output image. Consequently, the original is therefore advantageously scanned with a predetermined resolution which is lower than the resolution desired for the mask. This lower resolution has to be subsequently increased in an intermediate step. This is achieved by storing each scanned density value more than once. However, it is even more advantageous to increase the resolution by associating with each memory address of each density value a predetermined number of addresses in the raster image. If the resolution is to be quadrupled, then, for example, 16 addresses in the raster memory have to be associated with one address in the density value memory which is used to store the density values of the scanned low resolution image to be rastered.

Each of the 16 addresses reads out the same density value. However, as a result of error diffusion, this single density value generates different raster pixels.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
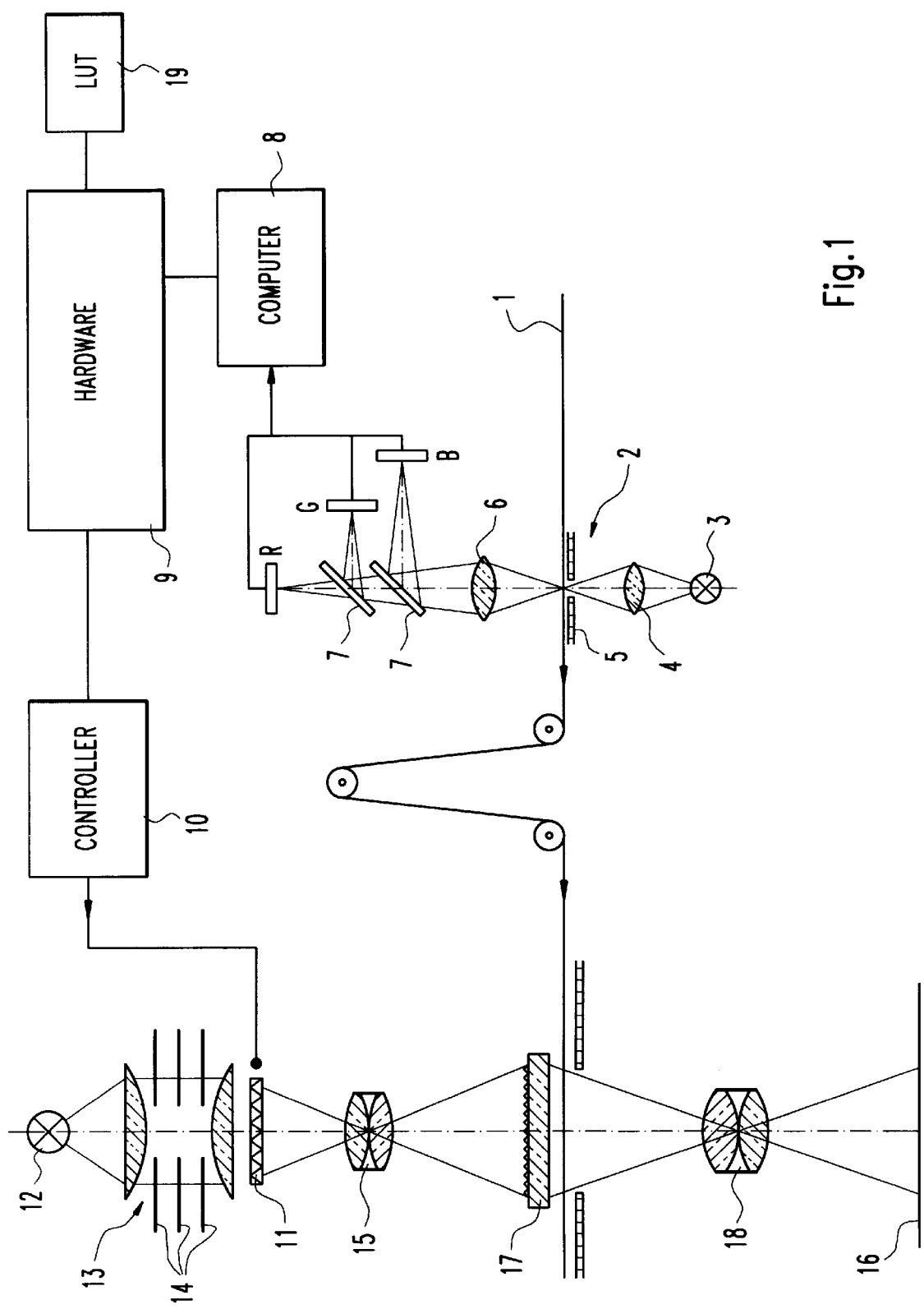
FIG. 1 illustrates a copying device according to the present invention.

As shown in FIG. 1, an original transparency 1 is passed through a scan station 2. The original is scanned pixel by pixel with a light source 3, a lens 4 and a slit 5. The light beam which passes through the film is collimated again by a lens 6 and then separated into the different colors (R=red, G=green and B=blue) by beam splitters 7. From the scanned values, a computer 8 determines density values for a mask and transmits the density values to the rastering hardware 9 where the density values are converted to a reverse raster image according to the error diffusion method. The pixel to be rastered next is selected so as to lie on the Hilbert path which is preset in a LUT 19. To generate the mask, the controller 10 addresses individual pixels of the light valve 11 according to the generated raster image. As indicated in FIG. 1, the light valve 11 can be any type of digital light valve, e.g. liquid crystals such as FLCD's or ceramics like PLZT. The light valves are illuminated with a second light source 12 through a condenser 13 which is provided with a color filter arrangement 14. The light source can also be replaced by LED's. A second lens arrangement 15 and, in addition, a diffraction disk 17 and a second lens arrangement 18 are placed in the light path before the paper 16.

Figure 2:
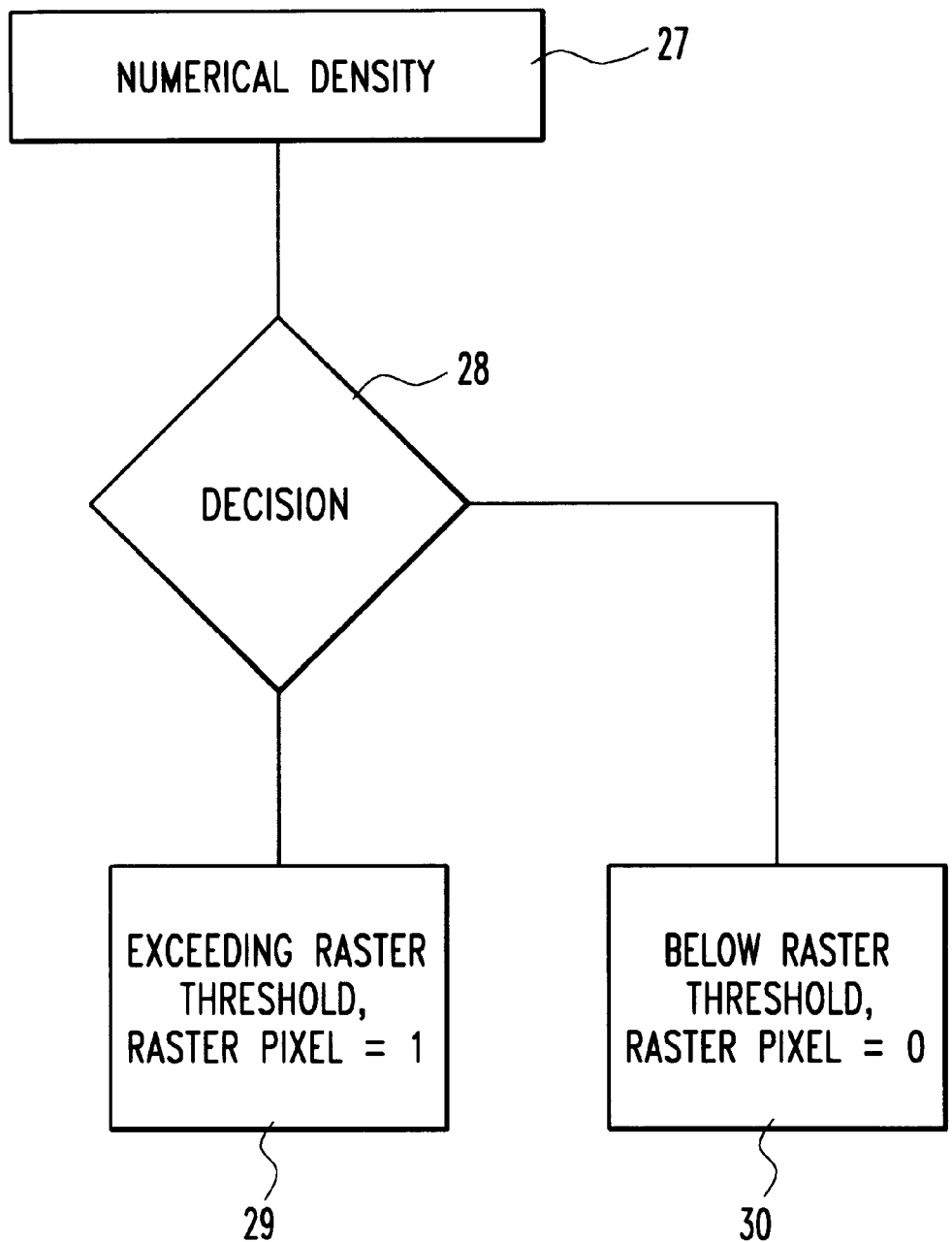
FIG. 2 is a flow diagram for generating the raster.

FIG. 2 shows a flow diagram to illustrate the sequence of steps when rastering the output image. The numerical density value of a pixel along the path is read from the density value memory and added in step 27 to the error produced by the quantization the preceding pixel, thereby forming a result. In decision step 28, this result is compared to a raster threshold value. If the result exceeds the raster threshold value, then the corresponding raster pixel is set to 1 (step 29). This produces another error which is taken into consideration in step 27 during the quantization of the next pixel. If the result in step 27 falls below the raster threshold value, then the corresponding raster pixel is set to 0 (step 30). Any residual error is again taken into account during the quantization of the next pixel (step 27).

Figure 3:
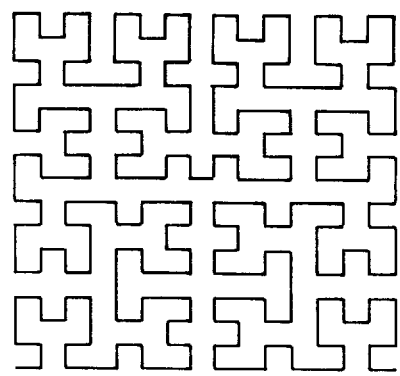
FIG. 3 illustrates a Hilbert curve.

FIG. 3 shows a Hilbert path through a raster with 16×16 pixels.

Figure 4:
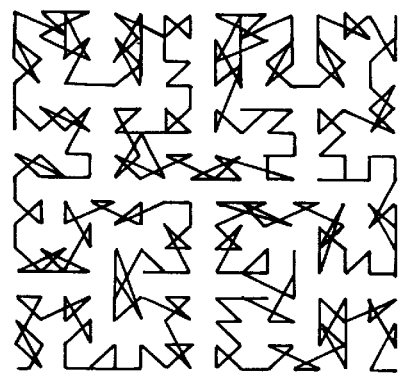
FIG. 4 illustrates a random Hilbert curve.

FIG. 4 illustrates a modification of this path. At each pixel of the path a random decision is made in which order the next two pixels along the Hilbert path are to be processed.

Figure 5A:
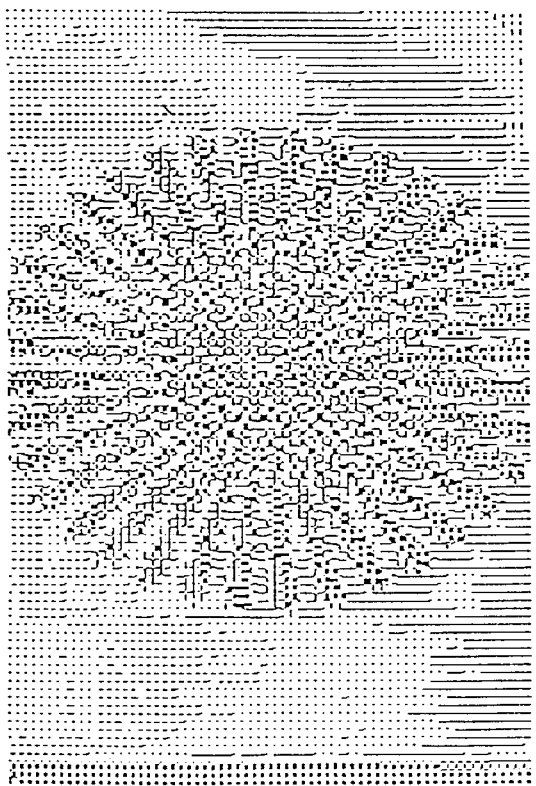
FIGS. 5a and 5b illustrates an examples for masks generated with different rastering methods.
Figure 5B:
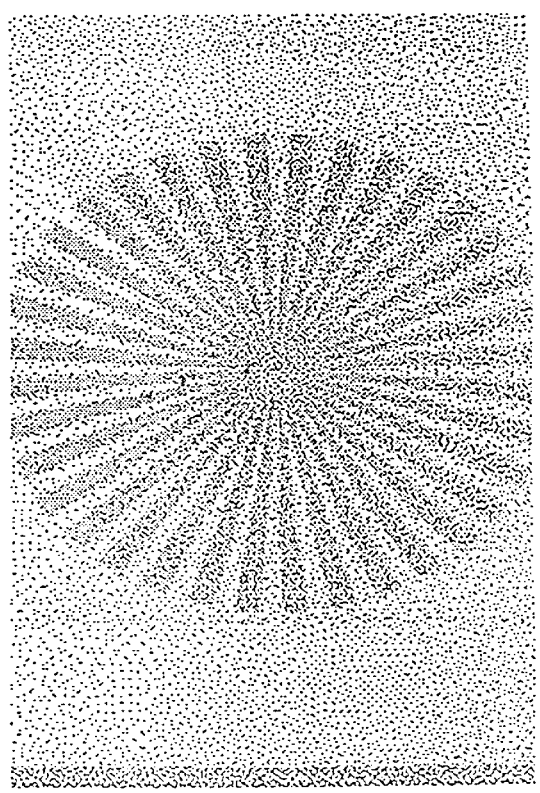

FIGS. 5a and 5b shows examples of a mask which is rastered by different methods. For the mask illustrated on the left, the original was rastered with the method described in DE 43 08 864. It is apparent that the sharp edges of the original are blurred by the mask, so that the edges of a copy of an original which is masked in this manner, can be expected to exhibit fringes. Conversely, the mask on the right side which was rastered with the method of the invention, exhibits sharp edges which are also reproduced as sharp edges on the masked copy.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for copying an original transparency to light-sensitive material, using an illuminator having a plurality of individually controllable pixels capable of switching to light or dark, for illuminating an image, comprising the steps of determining the density values of the original transparency with a predetermined spatial and gray-scale resolution and a computing device, by generating a mask from the density values;

generating a raster image from the density values which is reversed with respect to the original for providing an unsharp mask; and addressing the individual pixels of the illuminator according to the raster image which is generated according to an error diffusion method.

2. The method of claim 1, further comprising the step of computing the raster pixels along a predetermined path.

3. The method of claim 1, further computing the raster pixels along a self-avoiding path filling an entire area of the original transparency.

4. The method of claim 3, wherein the raster pixels are computed along a Hilbert path.

5. The method of claim 1, wherein the density values of the original transparency which are calculated with a predetermined spatial resolution, are converted into an output image with a higher spatial resolution.

6. The method of claim 5, wherein the raster image is generated with a spatial resolution equal to the output image.

7. An apparatus for copying an original transparency onto a light-sensitive material, comprising:

- an illuminator including a plurality of individually addressable pixels switchable to light or dark;
- an electronic control device for controlling the switchable pixels and an objective for imaging the original transparency onto the light-sensitive material;
- an image storage device for storing density values of the original transparency having a predetermined spatial and gray-scale resolution and a computing device, wherein the computing device is constructed such as to generate a mask from the density values of the image storage device, and such as to generate with a raster hardware a raster image of the mask according to an error-diffusion method; and wherein the control device is connected between the computing device and the illuminator such that the switchable pixels are addressable according to the generated raster image.

8. The apparatus of claim 7, wherein the raster hardware is employed for determining the raster pixels along a predetermined path.

9. The apparatus of claim 8, further comprising a look-up-table adapted to store the predetermined path.

10. A method for copying an original transparency to light-sensitive material, using an illuminator having a plurality of individually controllable pixels capable of switching to light or dark, for illuminating an image, comprising the steps of

- determining the density values of the original transparency with a predetermined spatial and gray-scale resolution and a computing device, by generating a mask from the density values;
- generating a raster image from the density values which is reversed with respect to the original;
- addressing the individual pixels of the illuminator according to the raster image which is generated according to an error diffusion method; and
- determining the raster pixels along a self-avoiding path filling an entire area, wherein the raster pixels are determined along a random Hilbert path.

* * * * *